Jan. 10, 1967     I-MING FENG ET AL     3,297,489
LAYERED ELECTRODE
Filed Dec. 17, 1964
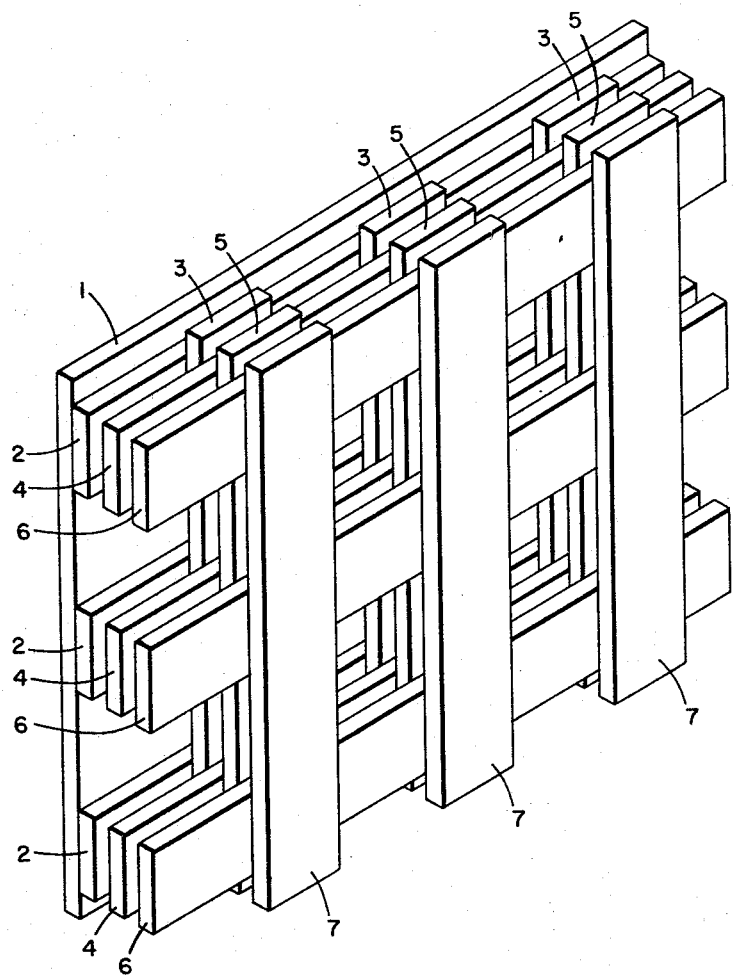
I-MING FENG
BARRY L. TARMY     INVENTORS
BY   *Henry Berk*
PATENT ATTORNEY United States Patent Office 3,297,489
Patented Jan. 10, 1967

3,297,489
LAYERED ELECTRODE
I-Ming Feng, Westfield, and Barry L. Tarmy, Berkeley Heights, N.J., assignors to Esso Research and Engineering Company, a corporation of Delaware
Filed Dec. 17, 1964, Ser. No. 418,984
10 Claims. (Cl. 136—120)

This invention is directed to an electrode for use in electrochemical reactions and in fuel cells. In particular, this invention is directed to an electrode having a particular configuration which affords a larger effective surface area without substantially changing the electrode dimensions and the method of making such electrode. More particularly, this invention is directed to an electrode having a large effective surface area for use in a fuel cell.

One of the problems facing the art in making a compact, highly efficient fuel cell has been the inefficiency of the particular electrodes used in the cells. The effective surface area per unit volume occupied by the prior electrodes has been quite small. In order to increase the effectiveness of the electrode, it is necessary to provide a very large surface area per unit volume of electrode. Various procedures have been attempted in order to provide such large surface area electrodes.

It has now been found that electrodes having a large effective surface area can be made by utilizing particular materials which have been assembled in a particular manner. The electrodes of this invention are made of a porous material consisting essentially of a polymer and a catalytic electrical conductor. The porous structural material which forms the skeleton of the electrode is made by intimately mixing finely divided polymer in dry powder form or liquid suspensions, finely divided electrically conductive catalyst, and a foraminating agent. The three components after being intimately mixed are pressed or extruded into flat or corrugated strips. This material in the form of strips is made into the electrode by utilizing one flat piece as the backing member and a plurality of thin elongated pieces which are arranged in layers on the flat backing piece so that the strips forming the alternate layers are parallel with an overlapping area or are at an angle to each other. A right angle is preferred. However, it can be any other angle. The strips in each of the layers are spaced apart each from the other. The void spaces defined by the spacing of the strips are packed with a compound which decomposes to a gas upon heating or with a porous polymeric material or with a mixture of a polymer and a compound which decomposes to a gas upon heating. The heat decomposable compounds which can be used in making electrodes in accordance with this invention include compounds such as ammonium oxalate and ammonium carbonate. These compounds decompose during the sintering step. The purpose of this packing is to support the strips during handling. The structure is then compressed and placed in an oven or other heating device and heated to the sintering temperature of the polymer. After a period of time of from 3 to 120 minutes, preferably 5 to 40 minutes, the electrode is removed from the oven and allowed to cool. The decomposition of the foraminating agent during sintering results in a porous structure for the shaped electrode. The resulting electrode is an integral structure wherein the porous layers are connected through their overlapping portions.

The polymers which can be used in making the electrodes of the instant invention include the polymers of tetrafluoroethylene, dichlorodifluoroethylene, ethylene-propylene, ethylene-butylene, halogenated ethylene-propylene, ethylene-butylene, propylene-butylene and iso-propylene-butylene.

The electrically conductive catalyst which can be used in the practice of this invention include those catalysts which will conduct a current such as noble metals, transition base metals, compounds of noble metals, compounds of transition base metals, mixtures of noble metals and transition base metals, mixtures of compounds of noble metals and transition base metals, alloys of noble metals, transition base metals and alloys of mixtures of noble metals and transition base metals, and combinations of the foregoing. As particular examples of electrical conductors which may be used in the practice of this invention, there may be named, platinum, silver, nickel, nickel boride, platinum-rhenium, platinum-iridium, iridium-ruthenium, platinum-rhenium-ruthenium, and nickel-aluminum-beryllium. There also may be used catalysts which are nonelectrically conductive, that is, catalysts having a resistance of about $10^1$ to $10^5$ ohm-cm., preferably $10^3$ ohm-cm. Of course, in using nonconductive catalysts, they must be used in conjunction with materials which will conduct an electrical current. This can be done by placing thin layers of a nonconductive material on top of electrically conductive layers.

Referring now to the attached drawing, there is shown a view of a typical electrode made in accordance with this invention. In the drawing, there is a backing sheet 1 upon which has been arranged a first layer of porous strips each numbered 2. At right angles to this first layer is a second layer of porous strips numbered 3. Another layer of strips is placed upon them and at right angle to the strips numbered 3. This latter layer is numbered 4. Alternate rows of strips numbered 5, 6 and 7 are placed one upon the other so that there are two sets of 3 rows of alternate strips placed at right angles to each other. In actual practice, the number of strips used in each row can vary from 2 to a number which is determined by the overall dimensions of the finished electrode and also by the size of the strips which can be from 0.31 to 1.0 inch. The number of layers, that is, the number of alternating layers of strips, can vary from 2 to 50. Preferably, there will be 6 to 12 alternating rows of strips. More preferably, 6 layers such as set forth in the drawing will be used. The backing sheet and the strips utilized in constructing electrodes in accordance with this invention can be composed of the same material or of different materials. That is, the binder materials may be different polymers and the electrically conductive materials may be different substances. However, in all cases, the backing sheet and the strips are porous materials consisting essentially of a binder and an electrically conductive material and a catalyst. It is, of course, apparent that the electrically conductive material and catalyst can be the same material.

The following examples are for purposes of illustration only and are not to be construed as a limitation upon the scope of the invention as set forth in the appended claims.

*Example 1*

In order to demonstrate the effectiveness of the electrodes made in accordance with the instant process, an electrode was made and compared to the best prior art electrode which is a platinum-polytetrafluoroethylene electrode made by the American Cyanamid Company. An electrode was made substantially as set forth in the drawing from material made by intimately mixing finely divided polytetrafluoroethylene, finely divided platinum and finely divided ammonium oxalate. The mixture was pressed into the desired shapes, heated to 180° C. in order to decompose the ammonium oxalate. The resulting porous structures were assembled substantially as set forth in the drawing. The material was then heated to 350° C. for about 3 minutes in order to sinter the structure into one integral piece. The prior art electrode and the electrode made in accordance with the instant invention were tested in a cathode half cell in order to determine the polarization. The lower the polarization in volts, the better the electrode. The cathodic half cell was maintained at a temperature of between 60° to 82° C. Both air and oxygen were used as the oxidant. The results of the tests are set forth in Table I below.

TABLE I

| Electrode | Oxidant | Polarization, Volts at Indicated ma./cm.$^2$ | | | |
|---|---|---|---|---|---|
| | | 10 | 20 | 50 | 100 |
| Best Prior Art | Air | 0.27 | 0.33 | 0.37 | 0.43 |
| New Structure | Air | 0.26 | 0.28 | 0.32 | 0.38 |
| Best Prior Art | $O_2$ | 0.23 | 0.27 | 0.31 | 0.33 |
| New Structure | $O_2$ | 0.23 | 0.25 | 0 27 | 0.29 |

It is to be noted from a study of the table that even though the prior art electrode and the electrode of this invention consists essentially of the same materials that the electrode made in accordance with the instant invention is substantially better.

*Example 2*

Three electrodes were assembled substantially in accordance with the drawing in order to test the efficiency of the electrodes. The electrodes were utilized as cathodes in a fuel cell utilizing 3.7 M sulfuric acid as the electrolyte and either air or oxygen as the oxidant. Electrode A was substantially as set forth in the drawing except that the electrode consisted of 8 layers of strips and the void spaces in the electrode were filled with porous polytetrafluoroethylene strips (60% porosity). Electrode B was substantially as set forth in the drawing in that it consisted of 6 layers. Electrode C was substantially as set forth in the drawing except that the void spaces in the drawing were filled with porous polytetrafluoroethylene strips (80% porosity). The results of the tests are set forth in Table II below.

TABLE II.—MULTI-LAYER ELECTRODES

| Electrode | Temp., °C. | Oxidant | Polarization From Oxygen Theory at Indicated ma./cm.$^2$ | | | | | | |
|---|---|---|---|---|---|---|---|---|---|
| | | | 0 | 1 | 10 | 20 | 50 | 100 | 160 |
| A | 82 | Air | 0.17 | 0.25 | 0.35 | 0.41 | 0.54 | 0.71 | |
| | 82 | $O_2$ | 0.14 | 0.21 | 0.29 | 0.32 | 0.39 | 0.47 | 0.53 |
| | 102 | $O_2$ | 0.14 | 0.21 | 0.29 | 0.33 | 0.41 | 0.49 | 0.56 |
| B | 22 | Air | 0.18 | 0.22 | 0.30 | 0.33 | 0.40 | 0.46 | 0.52 |
| | 60 | Air | 0.17 | 0.21 | 0.28 | 0.30 | 0.34 | 0.39 | 0.45 |
| | 82 | Air | 0.17 | 0.20 | 0.26 | 0.28 | 0.32 | 0.38 | 0.49 |
| | 20 | $O_2$ | 0.15 | 0.19 | 0.27 | 0.29 | 0.33 | 0.36 | 0.33 |
| | 62 | $O_2$ | 0.14 | 0.18 | 0.25 | 0.26 | 0.29 | 0.31 | 0.31 |
| | 83 | $O_2$ | 0.14 | 0.17 | 0.23 | | 0.27 | 0.29 | 0.34 |
| C | 23 | Air | 0.20 | 0.25 | 0.34 | 0.38 | 0.44 | 0.49 | 0.56 |
| | 60 | Air | 0.19 | 0.23 | 0.31 | 0.33 | 0.36 | 0.41 | 0.46 |
| | 82 | Air | 0.19 | 0.21 | 0.28 | 0.30 | 0.34 | 0.39 | 0.44 |
| | 60 | $O_2$ | 0.15 | 0.20 | 0.27 | 0.29 | 0.32 | 0.35 | 0.37 |
| | 82 | $O_2$ | 0.16 | 0.19 | 0.25 | 0.27 | 0.30 | 0.32 | 0.34 |
| | 100 | $O_2$ | 0.15 | 0.19 | 0.25 | 0.26 | 0.29 | 0.31 | 0.33 |

What is claimed is:
1. An electrode consisting essential of a porous rectangular sheet having fused thereto a plurality of strips arranged in layers such that each successive layer is at an angle to each juxtaposed layer, said strips and said sheet each consisting essentially of a porous material comprising a mixture of a polymer and a component, said component selected from the group consisting of an electrically conductive catalyst and a mixture of a catalyst and an electrically conductive material.

2. An electrode as defined in claim 1 wherein the porous strips are corrugated.

3. An electrode as defined in claim 1 wherein said polymer is polytetrafluoroethylene.

4. An electrode as defined in claim 1 wherein said catalyst is selected from the group consisting of platinum, silver, nickel, nickel boride, platinum-rhenium, platinum-iridium, platinum-ruthenium, platinum-rhenium-ruthenium and iridium-ruthenium.

5. An electrode as defined in claim 1 wherein said catalyst is a material having a resistance of about $10^1$ to $10^5$ ohm-cm.

6. An electrode consisting essentially of a porous rectangular sheet having heat fused thereto, a plurality of strips arranged in layers such that each successive layer is at a right angle to the juxtaposed layer, said strips and said sheet each consisting essentially of a mixture of polytetrafluoroethylene and a catalyst, said catalyst selected from the group consisting of platinum, silver, nickel, nickel boride, platinum-rhenium, platinum-iridium, platinum-ruthenium, platinum-rhenium-ruthenium and iridium-ruthenium.

7. An electrode as defined by claim 6 wherein said catalyst is silver.

8. An electrode as defined by claim 6 wherein said catalyst is nickel.

9. An electrode as defined by claim 6 wherein said catalyst is nickel boride.

10. An electrode as defined by claim 6 wherein said catalyst is platinum-rhenium-ruthenium.

No references cited.

WINSTON A. DOUGLAS, *Primary Examiner.*

A. SKAPARS, *Assistant Examiner.*